United States Patent [19]

Morikawa

[11] Patent Number: 4,931,960

[45] Date of Patent: Jun. 5, 1990

[54] CHARACTER IMAGE GENERATOR FOR STORING IMAGES IN A LANDSCAPE AND POTRAIT ORIENTATION

[75] Inventor: Takashi Morikawa, Toyokawa, Japan

[73] Assignee: Minolta Camera Kabushiki Kaisha, Osaka, Japan

[21] Appl. No.: 77,417

[22] Filed: Jul. 23, 1987

[30] Foreign Application Priority Data

Jul. 23, 1986 [JP] Japan ................... 61-174513

[51] Int. Cl.$^5$ ............................. G06F 3/12
[52] U.S. Cl. ................... 364/519; 340/735
[58] Field of Search ............... 364/518, 519; 340/735, 340/728, 727, 790; 400/61, 72, 76, 103

[56] References Cited

U.S. PATENT DOCUMENTS

| | | | |
|---|---|---|---|
| 4,004,486 | 12/1976 | Schomburg | 340/728 X |
| 4,168,488 | 9/1979 | Evans | 340/146.3 H |
| 4,312,045 | 1/1982 | Jean et al. | 340/727 X |
| 4,316,188 | 2/1982 | Cancasci, Jr. | 340/735 |
| 4,560,980 | 12/1985 | Tillich | 340/727 |
| 4,613,856 | 9/1986 | Olin et al. | 340/735 X |
| 4,627,020 | 12/1986 | Anderson et al. | 364/900 |
| 4,636,783 | 1/1987 | Omachi | 340/727 |
| 4,703,515 | 10/1987 | Baroody, Jr. | 340/727 X |
| 4,737,779 | 4/1988 | Somigli et al. | 340/790 X |
| 4,763,281 | 8/1988 | Arakawa | 340/735 X |
| 4,799,173 | 1/1989 | Rose et al. | 364/518 |

*Primary Examiner*—Gary V. Harkcom
*Assistant Examiner*—Mark K. Zimmerman
*Attorney, Agent, or Firm*—Price, Gess & Ubell

[57] ABSTRACT

A character image generator provides a font memory for memorizing first and second bit images of every character which is comprised of a font read-only memory (ROM) and a font random access memory (RAM). When a user makes a bit image of an external character desired and the bit image is down-loaded from the host data processor, the bit image is automatically rotated by 90 degrees and the bit image rotated is registered in the font RAM together with the bit image down-loaded.

4 Claims, 5 Drawing Sheets

Fig. 1(a)
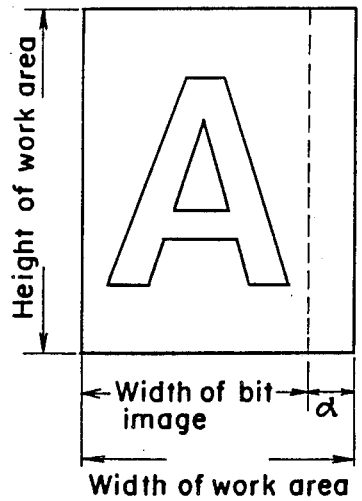
Fig. 1(d)
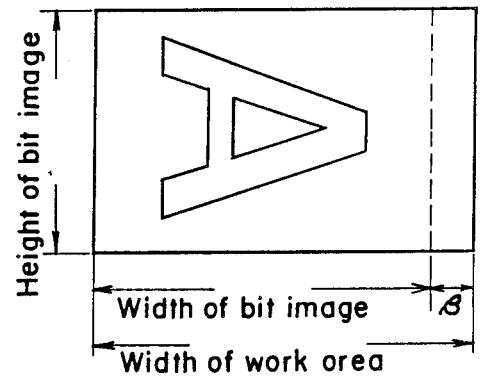
Fig. 1(b)
```
   j →
i  ┌──┬──┬──┬──┬──┐
↓  │ 1│ 2│ 3│ 4│ 5│
   ├──┼──┼──┼──┼──┤
   │ 6│ 7│ 8│ 9│10│
   ├──┼──┼──┼──┼──┤
   │11│12│13│14│15│
   ├──┼──┼──┼──┼──┤
   │16│17│18│19│20│
   ├──┼──┼──┼──┼──┤
   │21│22│23│24│25│ } 8 dots
   └──┴──┴──┴──┴──┘
         8 dots
```
Fig. 1(c)
```
    j' →
i'  ┌──┬──┬──┬──┬──┐
↓   │21│16│11│ 6│ 1│
    ├──┼──┼──┼──┼──┤
    │22│17│12│ 7│ 2│
    ├──┼──┼──┼──┼──┤
    │23│18│13│ 8│ 3│
    ├──┼──┼──┼──┼──┤
    │24│19│14│ 9│ 4│
    ├──┼──┼──┼──┼──┤
    │25│20│15│10│ 5│
    └──┴──┴──┴──┴──┘
```

CHARACTER IMAGE GENERATOR FOR STORING IMAGES IN A LANDSCAPE AND POTRAIT ORIENTATION

BACKGROUND OF THE INVENTION

1. Field of the Invention

The present invention relates to a character image generator and, especially to a character image generator capable of transforming certain type of external character images to another type of images rotated by 90 degrees.

2. Description of the Prior Art

In a character image generator, there is provided at least one font memory wherein individual bit images of characters to be generated are stored. These bit images are designed according to a predetermined font. Each bit image is formed in a memory area defined, for example, by 24 bits (horizontal or width)×40 lines (vertical or height).

In a character image generator, character code data transmitted from a host data processor such as a host computer are stored in a text-buffer once. Then, character code data stored in the text buffer are read out therefrom serially and bit images corresponding to character codes are outputted to a printer which are obtained by reading out bit images stored in a font memory.

There are provided many available fonts and every user can choose a desirable one among them. Every font has two types with respect to the orientation of each character. In one type, every bit image is oriented in a vertical direction (portrait type) and, in another type, every bit image is oriented in a horizontal direction (landscape type) which is obtained by rotating every bit image of portrait type in a clock-wise direction by 90 degrees. In other words, the former bit image of portrait type is formed, for example, in a memory area defined by 24 dots (horizontal)×40 lines (vertical) and the latter one is formed in a memory area, for example, defined by 40 dots (horizontal)×24 lines (vertical).

The font memory has a RAM for loading down bit images of external or special characters from the host data processor which are not registered in a ROM of the font memory for memorizing bit images of characters naturally contained in the font. In said ROM of the font memory, bit images of two types (portrait type and landscape type) are stored as one set. However, as far as individual external characters are concerned, bit images of two types with respect to each external character are not usually provided upon registering an external character. Therefore, it becomes necessary to transform every bit image of a first type to a bit image of a second type by the host data processor in order to transmit bit images of both types to the font RAM. Accordingly, for instance, in such a case that characters are to be printed on a cut paper in a landscape format namely along column lines, bit images of landscape type become necessary which are obtained by rotating respective bit images of portrait type by 90 degrees. Therefore, if a user wishes to register an external character desired in the font RAM, it is required for him to prepare not only a bit image of portrait type but also a bit image of landscape type in order to send both bit images to the printer.

SUMMARY OF THE INVENTION

An essential object of the present invention is to provide a character image generator being able to register both bit images of portrait and landscape types in a font RAM automatically at a printer side when a bit image of either one of two types is down-loaded to the font RAM.

Another object of the present invention is to provide a fast printer such as a page-printer with use of a laser beam which contains a font RAM for storing two bit images of portrait type and landscape type per one external character when either one of them is down loaded thereto.

BRIEF DESCRIPTION OF THE DRAWINGS

These and other objects and features of the present invention will be more apparent when the preferred embodiment of the present invention is described in detail with reference to the accompanied drawings in that, Figs. 1(a), 1(b), 1(c) and 1(d) are explanative views for showing a method for rotating a bit image by 90 degrees.

DESCRIPTION OF THE PREFERRED EMBODIMENT

Figure 2:
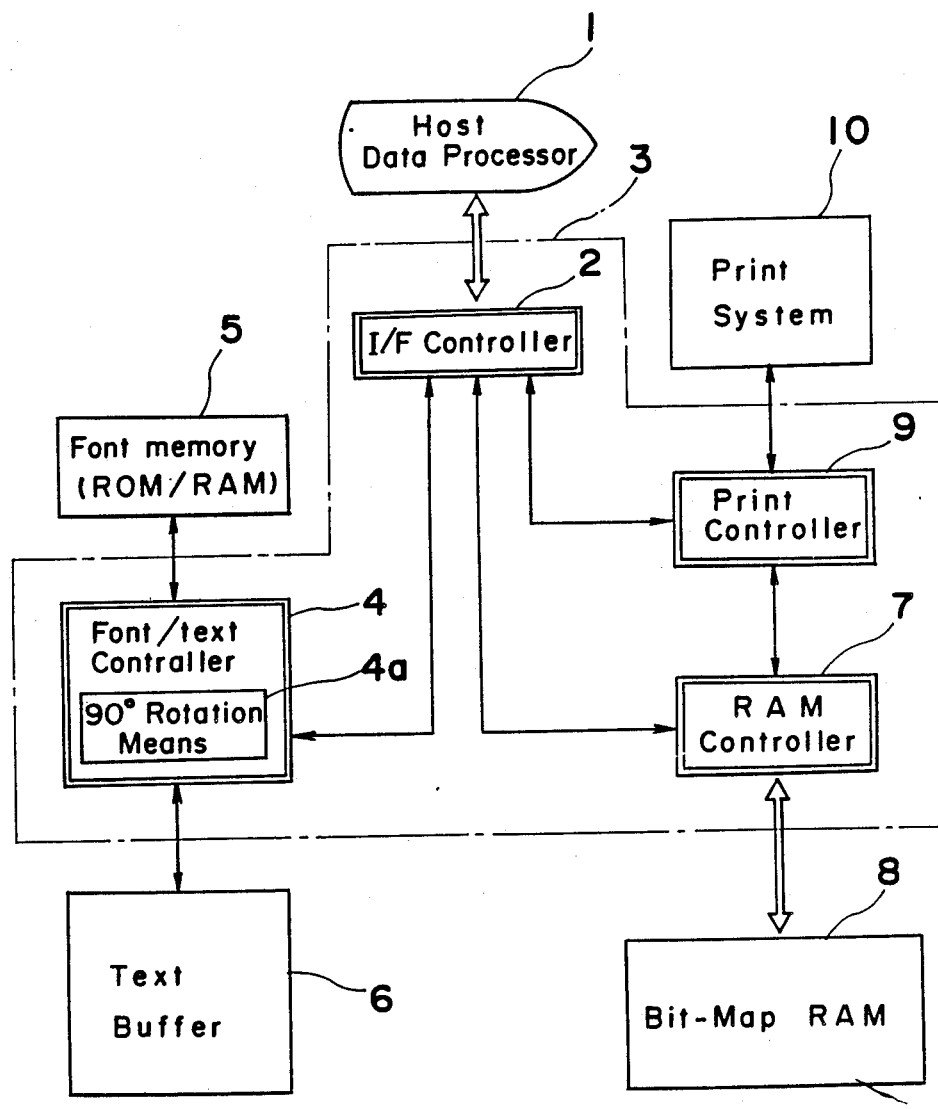
FIG. 2 is a block diagram of the character image generator according to the present invention.

FIG. 1(a) shows an example of a bit image of portrait type schematically. The bit image of "A" is formed as a pattern having a width of 20 dots and a height of 35 dots. Each bit image is memorized in unit of one byte comprised of a constant number of bits (for example 8 bits) in the direction of width thereof (horizontal direction). Accordingly, in such a case that a bit number in the horizontal direction of a real bit image is not a multiple of 8 bits, there exists a residual blank portion of $\alpha$ bits in the right most byte area of a memory area assigned to every bit image (in this example $\alpha=4$ bits). A real memory area needed to memorize the bit image "A" is 3 bytes (width) ×35 bits (height) (=840 bits×bits)

When this bit image is rotated by 90 degrees in a clock-wise direction, another bit image of landscape type is obtained as shown in FIG. 1(d). This bit image obtained has a width of 35 bits and a height of 20 bits which are equal to the height and width of the former bit image, respectively. Since a bit number of the width of the latter bit image is not a multiple of 8 bits, a residual blank portion of $\beta$ bits ($\beta=5$ in this example) exists in the area corresponding to the right most byte. A real memory area needed to memorize the bit image "A" is 5 bytes (width) ×20 bits (height) (=800 bits×bits).

According to the present preferred embodiment, in the case of an external character, not only a bit image of portrait type but also a corresponding bit image of landscape type which is obtained by rotating the former image by 90 degrees can be registered into a font RAM upon down-loading the former image from the host data processor 1 to the printer 10.

Herein-below, a method for rotating a bit image by 90 degrees will be explained. This rotation operation is carried out at the side of the printer with use of a software provided therein.

In order to simplify a transformation operation with use of the software, a square defined by a matrix of 40×40 (bits×bits) is assumed as a work area. As shown in FIG. 1(b), individual unit matrices each of which is defined by 8×8 (bits), i.e., raster data of 8 bits are numbered in ascendant order from the left to the right and from the top to the bottom as indicated by arrows j and i.

When said work area is rotated about the center thereof by 90 degrees, individual unit matrices numbered are transferred as shown in FIG. 1(c). This rotation can be done by a coordinate transformation from the original coordinate (i, j) to a new coordinate (i', j'). The rotation operation about each unit matrix of (8 bits×8 bits), namely each raster data, is carried out by a hardware provided in the printer. After transforming all of unit matrices, unnecessary lower raster data of 40 bits (width)×16 bits (height) being identified by the numbers 4, 5, 9, 10, 14, 15, 19, 20, 24 and 25 are removed. Thus, a bit image of 35 bits (width)×20 bits (height) is formed as a landscape type bit image in a work area of 40 bits (width)×24 bits (height) as shown in FIG. 1(d). The bit image thus obtained is down-loaded to the font RAM finally.

FIG. 2 shows a block diagram of the character image generator according to the present invention.

Data transmitted from an external host data processor such as a host computer are input, via an interface controller 2, into a controller 3 for a printer 10.

The controller 3 is comprised of at least one microcomputer (not shown). A font text controller 4 writes a head address of each bit image into a text buffer according to a directory read out from a font ROM of a font memory 5 corresponding to each of the data entered. Further, the font text controller 4, when a down-load operation is demanded by the host data processor 1, executes the download operation and due to this operation, bit images (dot pattern) of external characters are stored into a font RAM of the font memory 5.

Upon this operation, transformation means 4a provided for rotating a bit image of portrait type in the font text controller 4 transforms said bit image into a bit image of landscape type when it is sent thereto and the font text controller 4 registers the latter bit image together with the former bit image into the font RAM of the font memory 5, as mentioned above.

Further, the font text controller 4 reads out data stored in the text buffer 6 and writes bit images read out from the font memory corresponding to said data, via a RAM controller 7, into a bit map RAM 8. When all bit images to be contained in one page have been stored in the bit map RAM 8, these bit images are sent, via a print controller 9, to the printer 10 and printed on a paper sheet thereby.

Figure 3:
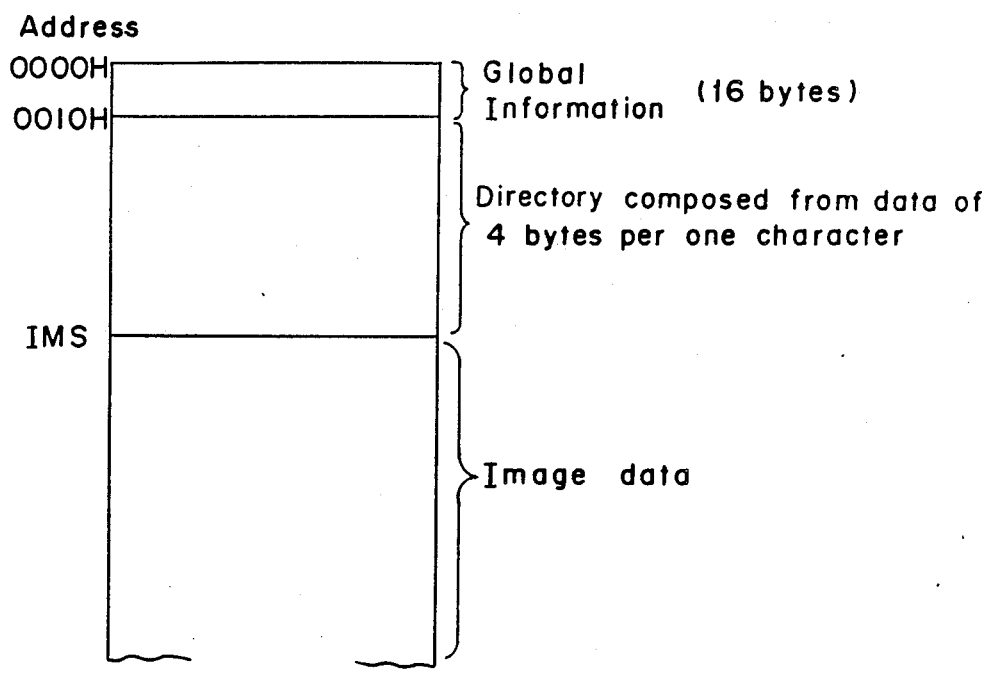
FIG. 3 is a schematical view of a memory map of a font memory.

FIG. 3 shows a schematical memory map of the font memory 5. In the font memory 5, data are read out in unit of byte and, therefore, addresses are assigned in unit of byte. In an area defined from zero-th address to "FH"-th address, global information is written which contains information representing general properties of a font. In a directory area starting from "10H"-th address, compositions of individual characters and information regarding to indexes of individual real bit images are written with use of data in unit of 4 bytes. Next to the directory, individual bit images are written, respectively. Top address (IMS) of the area provided for individual bit images is variable according to a number of characters to be stored therein since the volume of the directory is determined by said number of characters.

Figure 4:
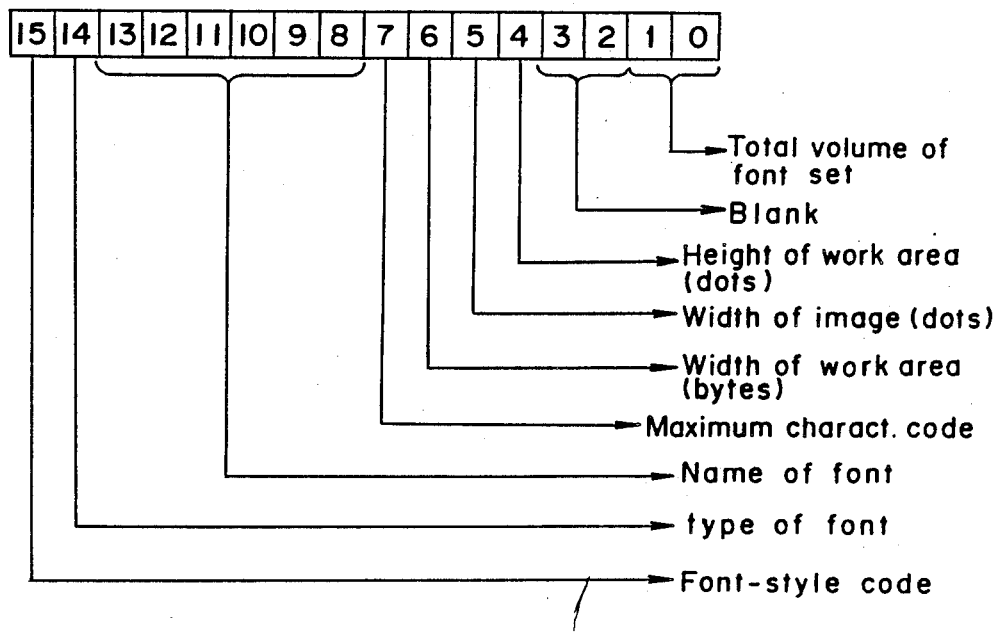
FIG. 4 is an explanative view for showing a composition of global information.

FIG. 4 shows a composition of the global information to be stored in the font memory 5. The global information is comprised of 16 bytes defined from zero-th address to 15th address and contains general properties of the font. At 15th address, a code assigned to the font of characters stored in the font memory 5 and a code indicating "Empty RAM" (=0) are written. The area defined by 14th address is used as switch-bits for indicating individual selections with respect to variable items to be set. Among these variable items, there is contained a selection between the portrait type and the landscape type. In the area defined from 13th address to 8th address, the title of the relevant font is written as an abbreviation thereof with 6 bytes. In the area identified by 7th address, data representing the maximum character code contained in the relevant font is written. In areas identified by 6th and 5th addresses, data representing numbers of dots and bytes with respect to the width of character are written, respectively. In the area identified by 4th address data representing a number of dots with respect to the height of base line of the working area are written. In the area identified by zero-th and 1st, data representing a total number of bytes (total volume) of the relevant font file are written. The area identified by 3rd and 2nd addresses is kept blank.

Figure 5A:
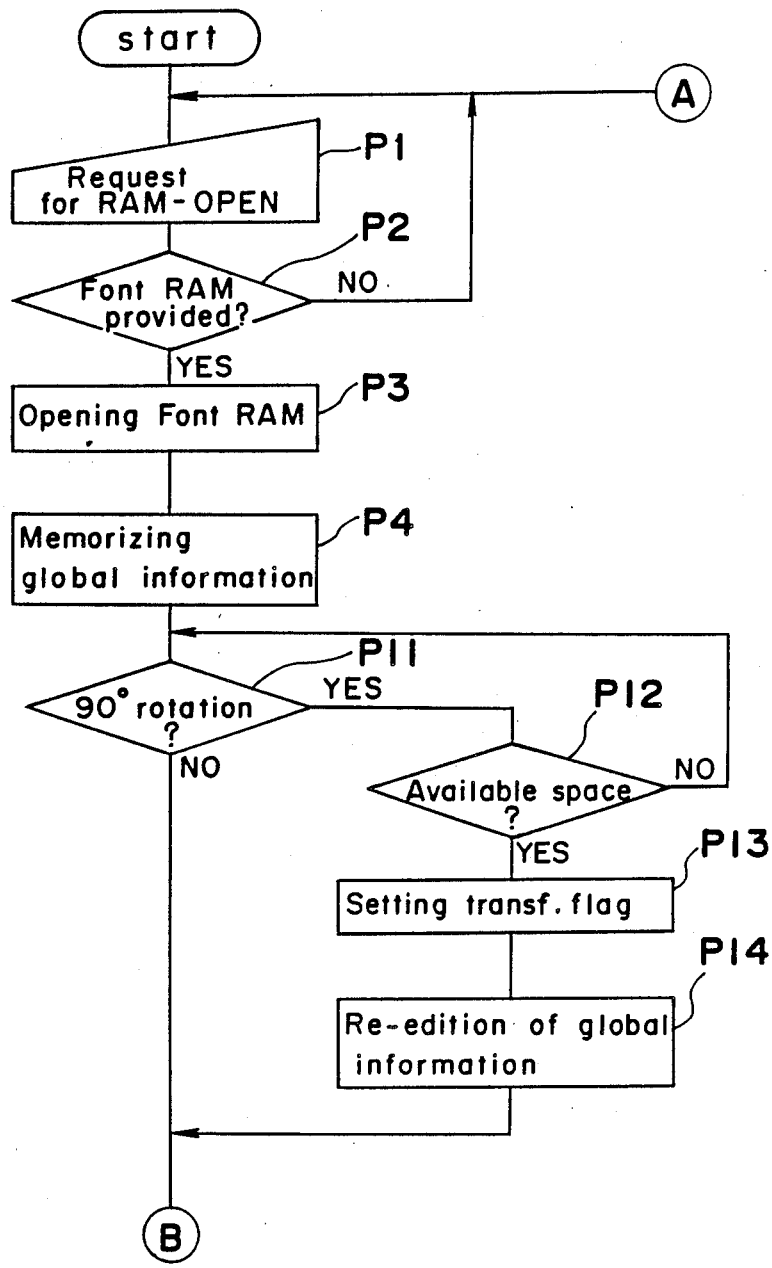
FIGS. 5(a) and 5(b) show a flow chart to be executed upon down-loading bit images of individual external characters.
Figure 5B:
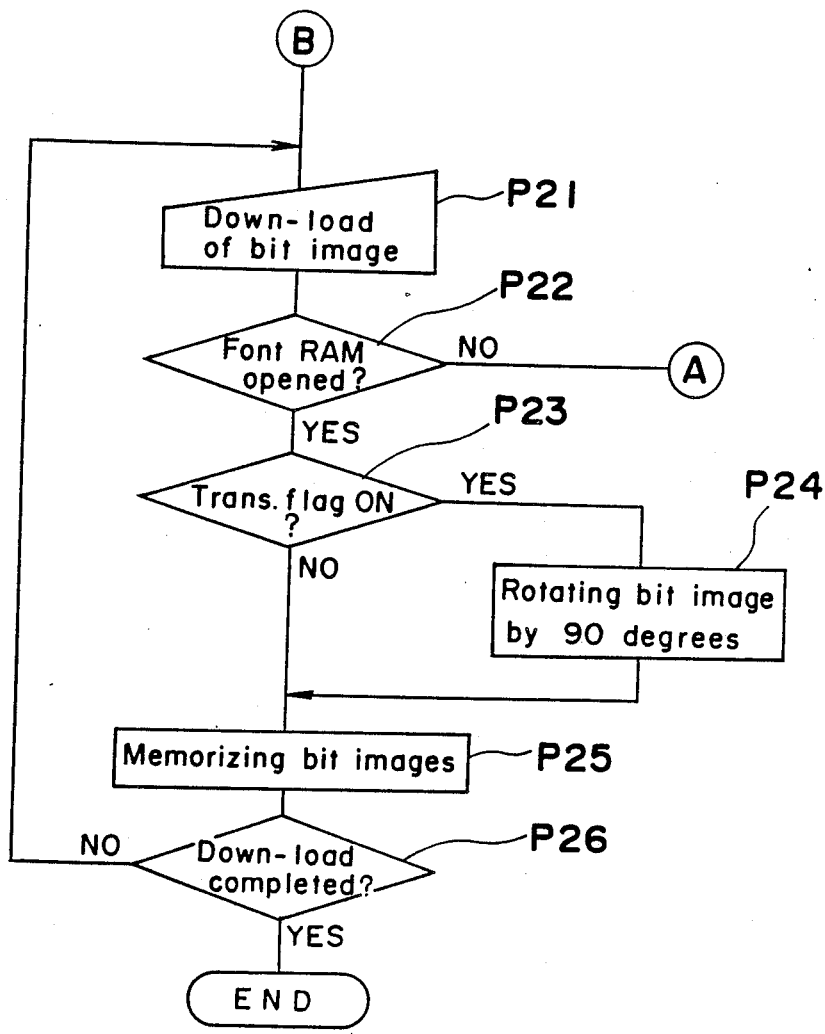

FIG. 5 shows a flow chart of a down-load processing to be executed by the font text controller 4.

When "RAM open" or "down-load" is requested at step P1, it is checked at step P2 whether the font RAM is provided in the font memory. If it is provided, it is made accesible at step P3 and the global information for identifying the font is loaded thereinto at step P4.

If a rotation operation for rotating a bit image by 90 degrees is requested by the host data processor 1 at step P11, it is checked whether there is a blank area available for memorizing a bit image transformed. If there is no area for memorizing, the process returns to step P11. If there is an area available therefor, a flag provided as a transformation flag is set at step P13.

At step P14, global information regarding to a bit image transformed is sought based on the global information having been loaded already and, at the same time, directory data in a format of 4 bytes per one character is made.

Next to step P11 or step P14, the process is forwarded to the next step P21.

When a bit image is transmitted thereto at step P21, it is checked at step P22 whether the font RAM is accessible or not. If it is not accessible, the process returns to the first step P1. If accessible, it is checked at step P23 whether the transformation flag has been set or not. If the flag has been set, a rotation of the bit image by 90 degrees is carried out at step P24 and, at step P25, the bit image having been transformed is memorized together with the original bit image in the font RAM. At the next step P26, it is checked whether the down-load operation has been completed or not. If completed, the process is ended. If not completed, the process returns to step P21 in order to execute a transformation of the next bit image.

As is understood from the preferred embodiment mentioned above, according to the present invention, each of the bit images of external characters is automatically rotated by 90 degrees upon down-loading them to the printer and each bit image having been transformed is registered into the font RAM together with the original bit image. Accordingly, upon registering an external character desired, it becomes unnecessary for a user to make both bit images of portrait and landscape types.

While there has been described the preferred embodiments, modifications and variations being obvious to those skilled in the art are possible without departing from the spirit of the invention. The scope is therefore to be determined solely by the appended claims.

What is claimed is:

1. In a printer system in which bit images of characters to be printed are read out from a font memory in correspondence with character code data sent from a host data processor, the improvement comprising:
    a font RAM provided in said font memory for memorizing bit images of external characters to be downloaded from said host data processor;
    means for receiving one bit image for an external character downloaded from said host data processor and for rotating the bit image of the external character downloaded by 90 degrees, to thereby produce a rotated bit image of the external character, and
    means for registering said bit image downloaded together with said rotated bit image into said font RAM.

2. The printer system of claim 1, wherein said registering means comprises judgment means for judging whether or not said font RAM has a capacity for storing said rotating bit image of the external character.

3. In an improved character image generator for storing received images in a bit image format having a height and width for a printer system capable of printing in a landscape and portrait mode of operation, the improvement comprising:
    font RAM means for receiving raster image data in the format of bit image data;
    means for determining a height and width orientation for specific bit image data in said font RAM means;
    means for transforming the determined orientation of the specific bit image data by 90 degrees in the printer system;
    means for removing unnecessary raster image data from the transformed bit image data, and
    means for coordinated storage of both the specific bit image data in its pretransformed format and in its posttransformed format in the font RAM.

4. In an improved character image generator for storing received images of a bit image format in both a landscape and portrait orientation to expedite a subsequent printing operation, the improvement comprising:
    a controller for directing formatting of image data;
    a font ROM containing a directory of font characters;
    a text buffer that receives a head address of each bit image from the controller according to the font ROM;
    means for determining from the head address a height and width orientation for specific bit image data represented by the head address;
    means for transforming the determined orientation of the specific bit image data from its original orientation to a new orientation;
    a font RAM for coordinating storage of both the specific bit image data in its pretransformed oriental format and also in its posttransformed new oriented format, whereby the controller causes the transformation of the specific bit image data by the transforming means and simultaneous storage of both orientations of the bit image data in the font RAM, whereby an expedited transfer of desired bit images to be printed can be written into the text buffer for a subsequent printing mode of operation.

* * * * *